United States Patent
Virdi et al.

[19]

[11] Patent Number: 5,948,239
[45] Date of Patent: *Sep. 7, 1999

[54] PROCESS FOR OBTAINING DISTILLATE FUEL PRODUCTS USING A MULTI-BED CATALYTIC REACTOR

[75] Inventors: Harjeet S. Virdi, SugarLand; Benjamin Klein, Houston, both of Tex.; R. John McNab, Randolf, N.J.

[73] Assignee: ABB Lummus Global Inc., Bloomfield, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/815,220

[22] Filed: Mar. 12, 1997

[51] Int. Cl.$^6$ .................................................. C10G 45/00
[52] U.S. Cl. ........................... 208/57; 208/145; 208/143; 208/144; 208/210; 208/213; 208/217; 208/254 H
[58] Field of Search .................................. 208/145, 143, 208/144, 57, 210, 213, 217, 254 H

[56] References Cited

U.S. PATENT DOCUMENTS

| | | | |
|---|---|---|---|
| 2,993,855 | 7/1961 | Fear | 208/143 |
| 3,159,568 | 12/1964 | Price et al. | 208/89 |
| 3,450,784 | 6/1969 | Reilly et al. | 260/667 |
| 3,728,249 | 4/1973 | Antezana et al. | 208/57 |
| 4,194,964 | 3/1980 | Chen et al. | 208/108 |
| 4,312,741 | 1/1982 | Jacquin | 208/11 LE |
| 4,430,203 | 2/1984 | Cash | 208/210 |
| 4,451,677 | 5/1984 | Bradley et al. | 568/881 |
| 5,183,556 | 2/1993 | Reilly et al. | 208/57 |
| 5,558,766 | 9/1996 | Prada et al. | 208/59 |

FOREIGN PATENT DOCUMENTS

| | | |
|---|---|---|
| 0 223 514 A1 | 5/1987 | European Pat. Off. . |
| 0 355 303 A1 | 2/1990 | European Pat. Off. . |
| 922259 | 3/1963 | United Kingdom . |

OTHER PUBLICATIONS

International Search Report, Application No. PCT/US 98/04523, ABB Lummus Global Inc., Mar. 9, 1998.

Hamilton, Gary; Granniss, Lee; Scotti, Lou; and Suchanek, Arthur; "Producing Diesel Fuels for Upcoming Environmental Regulations"; ABB Lummus Crest; Asea Brown Boveri; Jan. 20, 1993.

*Primary Examiner*—Walter D. Griffin
*Assistant Examiner*—Nadine Preisch
*Attorney, Agent, or Firm*—Alix, Yale & Ristas, LLP

[57] ABSTRACT

Disclosed herein is a highly efficient process for producing distillate fuels using a multi-bed hydrogenation reactor. The temperature of the feed to the second and subsequent reactor beds is controlled by removing effluent from the prior bed, cooling the effluent in an external heat exchanger, injecting hydrogen gas into the effluent mixture, and inserting the cooled mixture containing hydrogen gas into the inlet of the next reaction zone.

7 Claims, 1 Drawing Sheet

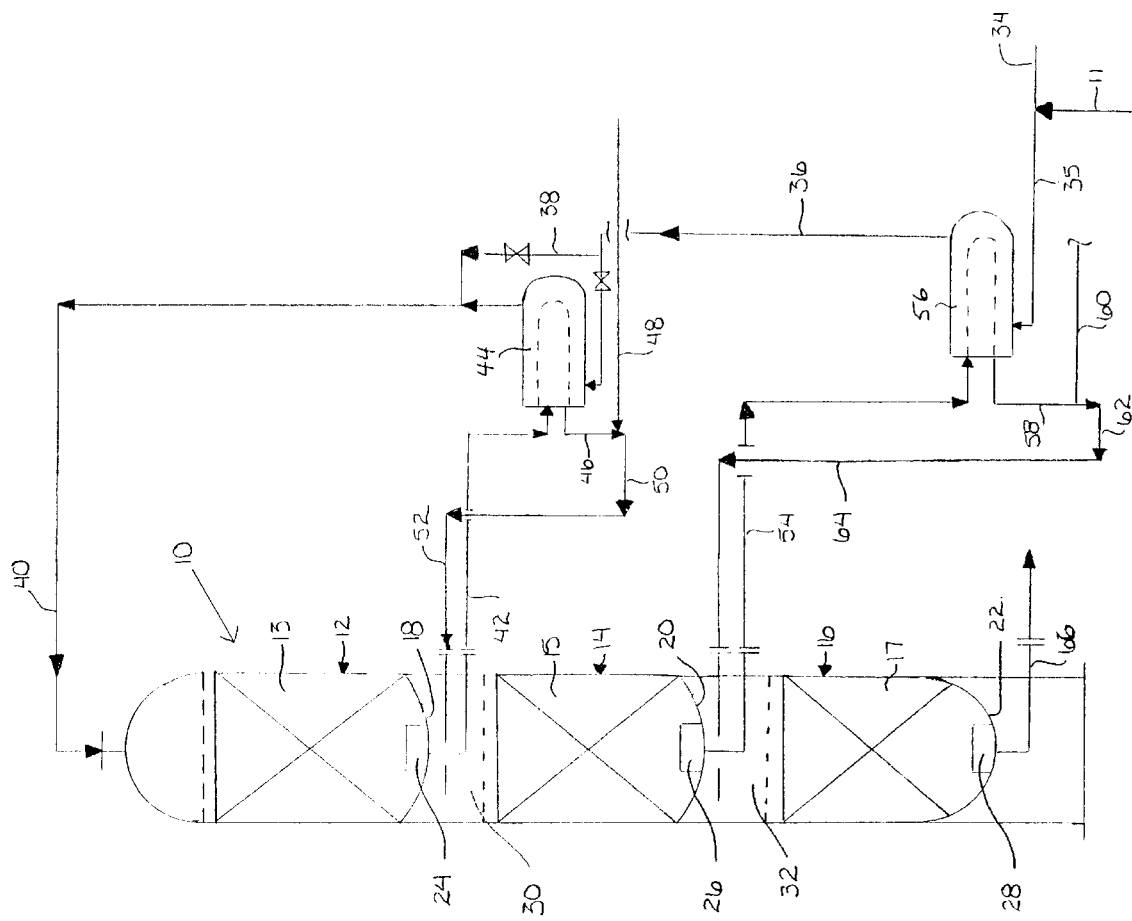

PROCESS FOR OBTAINING DISTILLATE FUEL PRODUCTS USING A MULTI-BED CATALYTIC REACTOR

BACKGROUND OF THE INVENTION

The present invention relates to the upgrading of distillate fuels, and more particularly to a process for removing sulfur, nitrogen and aromatic compounds from distillate fuels using a multi-bed catalytic reactor.

When distillate fuels are produced from hydrocarbon feed, it is necessary to remove sulfur and nitrogen and to saturate the aromatics in order that the distillate fuel meets environmental standards and has a sufficiently high cetane number. When hydrocarbon feeds for producing distillate fuels are subjected to desulfurization, denitrogenation and dearomatization in a catalytic reactor, a significant temperature increase takes place across the reactor bed due to the exothermic heats of reaction. One known technique for compensating for this temperature rise in a multi-bed reactor is to use interbed gas and/or liquid quenching. In this type of process, the quenching fluid is introduced through distributors into a mixing device, known as a quench box, which is located between adjacent catalyst beds. The quench gas or liquid provides direct contact cooling of the reaction mixtures. When this technique is used, quench gas, which usually is recycle gas, is injected in a quantity sufficient to readjust the hydrogen partial pressure to the desired level. Quenching liquid, which usually is a recycle liquid, is then used to provide for the remaining cooling requirements.

There are several disadvantages to the above-mentioned direct contact cooling system. The use of recycle gas and/or liquid for direct contact cooling requires the use of relatively large compression equipment for supplying cooling gas. Furthermore, when cooling liquid is used, a larger catalyst volume may be required than would be needed if no liquid quench were used.

SUMMARY OF THE INVENTION

An object of the invention is to provide a process for producing distillate fuel using a multi-bed reactor which uses an efficient cooling system for cooling the reaction mixture.

Another object of the invention is to provide an improved method for controlling the temperature in a multi-bed catalytic reactor which is used for producing distillate fuels.

Yet another object of the invention is to provide a process for making distillate fuels using simplified and therefore less expensive equipment.

A further object of the invention is to provide a system and method for producing distillate fuels in which quenching liquid is not required.

Another object of the invention is to provide a system and method for producing distillate fuels in which a compressor of reduced size can be used.

Other objects will be in part obvious and in part pointed out more in detail hereinafter.

The invention in a preferred form is a process for making distillate fuels from a distillate hydrocarbon feed. The process comprises introducing distillate hydrocarbon feed and hydrogen gas into a first reaction zone of a multi-bed reactor in order to produce a first reaction mixture. The first reaction mixture is removed from the multi-bed reactor and is cooled in a first heat exchanger using the hydrocarbon feed as the cooling medium. Hydrogen gas is injected into the cooled first reaction mixture in order to reduce the density of the first reaction mixture while further cooling the first reaction mixture. The cooled first reaction mixture containing injected hydrogen gas is then introduced into a second reaction zone of the multi-bed reactor in order to produce a second reaction mixture.

Preferably, the first reaction mixture is cooled in the first heat exchanger prior to injection of hydrogen gas. This creates a density differential of the two phase mixture and promotes hydraulic circulation.

The hydrogen gas preferably is injected in an amount sufficient to provide for about half of the total cooling requirement for the first reaction mixture prior to introduction into the second reaction zone.

In a particularly preferred form, the process of the invention further includes the steps of removing the second reaction mixture from the multi-bed reactor, cooling the removed second reaction mixture in a second heat exchanger, injecting hydrogen gas into the second reaction mixture upon cooling in order to reduce the density of the second reaction mixture and to cool the second reaction mixture, and introducing the cooled second reaction mixture containing injected hydrogen gas into a third reaction zone of the multi-bed reactor in order to obtain a third reaction mixture.

The invention accordingly comprises the several steps and the relation of one or more of such steps with respect to each of the others and the system possessing the features, properties, and the relation of elements exemplified in the following detailed disclosure.

BRIEF DESCRIPTION OF THE DRAWING

The Figure is a process flow diagram showing a preferred embodiment of a system for producing distillate fuels in accordance with the present invention.

DETAILED DESCRIPTION OF THE INVENTION

The process and system of the invention are particularly adapted for use in hydrogenating hydrocarbons to produce distillate fuels. The feed typically has about 10% by volume boiling point of from about 300° F. (149° C.) to 500° F. (260° C.), and about 90% by volume boiling point of at least about 500° F. (260° C.) and no more than about 750° F. (399° C.).

A representative example of a distillate hydrocarbon feed which may be hydrogenated in accordance with the present invention has the following characteristics:

| | |
|---|---|
| Density, A.P.I. | 16.8–29.9 |
| H/C Atomic Ratio | 1.4–1.9 |
| Sulfur, wt. % | 0.2–1.2 |
| Nitrogen, wt. % | 0.01–0.1 |
| FIA, vol. % | |
| Aromatics | 35–60 |
| Olefins | 1–4 |
| Saturates | Balance |
| Distillation, ° F. | |
| Initial Boiling Point | 310–430 (154–221° C.) |
| 10% | 390–495 (199–257° C.) |
| 50% | 510–575 (266–302° C.) |
| 90% | 625–690 (329–366° C.) |
| End Point | 700–780 (371–416° C.) |

It is to be understood, however, that the scope of the present invention is not to be limited to this particular distillate hydrocarbon feed.

Referring now to the Figure, the hydrogenation of the hydrocarbon feed takes place in a reactor 10 having a first reaction zone 12, a second reaction zone 14, and a third reaction zone 16. The first and second reaction zones 12 and 14 are packed with fixed beds of hydrogenation catalysts supported on partitions 18 and 20, respectively. The third reaction zone 16 is packed with a fixed bed of a hydrogenation catalyst which may be a noble metal or a non-noble metal hydrogenation catalyst and is supported on partition 22. Partitions 18, 20 and 22 have outlet collectors 24, 26 and 28, respectively connected thereto to provide for the removal of the reaction mixture from the reaction zone in which the particular outlet collector is positioned. Space 30 is provided between the partition 18 and the upper end of reaction zone 14, and space 32 is provided between partition 20 and the upper end of reaction zone 16, in order to allow for removal of the hot reaction mixture out of the reactor 10 and insertion of the cooled reaction mixture combined with hydrogen gas back into the reactor 10 in a manner described further below.

A fresh hydrocarbon feed which is to be upgraded to distillate fuel enters the reactor system in line 34 and is mixed with hydrogen from line 11 in line 35. The hydrocarbon feed and hydrogen gas mixture is preheated in heat exchangers 56 and 44 to the reaction temperature, i.e. a temperature of about 550–750° F. (288–399° C.), and is subsequently transferred in line 40 to the reactor 10. Stream 36 transfers the feed mixture from heat exchanger 56 to heat exchanger 44. Bypass line 38 around heat exchanger 44 is used, if necessary, to prevent excessive preheating of the feed mixture. The feed enters the top of the reactor 10. The feed passes downwardly through the catalyst bed 13 in the first reaction zone 12 under conditions in which a substantial amount of the sulfur, nitrogen and aromatic compounds are hydrogenated to form the desired diesel fuel products. Preferably, the first reaction zone 12 is operated at a temperature of from about 550° F. (288° C.) to about 750° F. (399° C.), more preferably from about 600° F. (316° C.) to about 710° F. (377° C.), and at a pressure of from about 600 psig (41.8 atm.) to about 2,000 psig (137.1 atm.), more preferably from about 750 psig (52.0 atm.) to about 1,500 psig (103.1 atm.) and at a hydrogen partial pressure from about 510 psig (35.5 atm) to about 1700 psig (11 6.5 atm), more preferably from about 640 psig (44.5 atm) to about 1275 psig (87.6 atm) and at an LHSV of from about 0.3 hr. to about 2.0 hr.$^{-1}$. The effluent from the first reaction zone 12 is a two-phase mixture of a liquid phase and a gas phase. The liquid phase is a mixture of the higher boiling components of the fresh feed. The gas phase is a mixture of hydrogen, inert gaseous impurities, and vaporized liquid hydrocarbons of a composition generally similar to that of the lower boiling components in the fresh feed. The liquid-gas reaction mixture from the first reaction zone 12 enters space 30 between the first and second reaction zones, at which point the mixture is removed from the first reaction zone 12 through outlet collector 24 and is removed from the reactor in line 42. The reaction mixture in line 42 enters heat exchanger 44 in which it is cooled, using the feed stream, to a temperature of about 600–660° F. (316–349° C.). The cooled reaction mixture exits the heat exchanger 44 in line 46. A stream of hydrogen gas is introduced into the cooled reaction mixture through line 48 to maintain the required hydrogen partial pressure at the inlet to the second reaction zone and reduce the density of the cooled reaction mixture to achieve circulation. At the same time, the gas further cools the reaction mixture to a temperature of about 550–700° F. (288–399° C.). The reaction mixture with newly injected hydrogen gas is then transferred via line 52 back to space 30 between the first and second reaction zones. The mixture which is injected at space 30 then passes downwardly to the second reaction zone 14. No liquid or gas quench tray is needed in space 30 or space 32.

In the second reaction zone 14, the reaction mixture and the newly injected hydrogen gas move downward together through catalyst bed 15 in order to hydrogenate additional aromatics. At the entrance to the second reaction zone 14, the reaction mixture with hydrogen gas preferably has a temperature of about 550–750° F. (288–399° C.). The hydrogen gas partial pressure is preferably about 600–1200 psig. The increased hydrogen partial pressure and cooler temperature are favorable for shifting chemical equilibrium towards saturated compounds, therefore providing for higher aromatics saturation. Preferably, the second reaction zone 14 is operated at a temperature of from about 550° F. to about 750° F., more preferably from about 600° F. (316° C.) to about 710° F. (377° C.), at a pressure of from about 600 psig (41.8 atm.) to about 2,000 psig (137.1 atm.), preferably from about 750 psig (52.0 atm.) to about 1,500 psig (103.1 atm.), and at an LHSV of from about 0.3 hr.$^{-1}$ to about 2.0 hr.$^{-1}$.

The liquid-gas reaction mixture from the second reaction zone 14 is removed from the second reaction zone 14 through outlet collector 26, is withdrawn from the reactor 10 through line 54, and is transferred to a heat exchanger 56 in which it is cooled, using the fed stream, to a temperature of about 600–660° F. (316–349° C.). The cooled reaction mixture is removed from the heat exchanger 56 in line 58 and is mixed with hydrogen gas from line 60 in order to maintain the required hydrogen partial pressure at the inlet to the third reaction zone and to further reduce the density of the reaction mixture to achieve circulation. The cooled reaction mixture with newly injected hydrogen gas is then returned to the reactor in line 64 and is inserted in space 32. The reaction mixture with hydrogen gas then moves downward through the third reaction zone 16 in which remaining aromatics are hydrogenated. In addition to saturating the aromatics, the reaction of the hydrocarbon reaction mixture with hydrogen gas in the third reaction zone 14 acts to strip dissolved $H_2S$ and $NH_3$ impurities from the liquid effluent, thereby improving the hydrogen partial pressure and, as a result, enhancing the catalyst's kinetic performance.

The reaction mixture containing newly injected hydrogen gas which enters third reaction zone 16 has a hydrogen partial pressure which is about 600–660 psig. The third reaction zone 16 with a catalyst bed 17 preferably is operated at a temperature of from about 550° F. (288° C.) to about 700° F. (371° C.), more preferably from about 600° F. (316° C.) to about 675° F. (357° C.), at a pressure and LHSV with approximately the same pressure range and LHSV range as the first and second reaction zones.

The liquid and gas effluent from the third reaction zone 16 accumulates at outlet collector 28 and is removed from the reactor 10 in line 66. This line contains the distillate fuel product. This product may then be processed further, such as by distillation, to remove any impurities.

The system and process of the invention are efficient in that no liquid quench is required and gas quench is minimized to that which is needed to obtain the desired hydrogen partial pressure. The injected hydrogen gas typically provides for half of the total cooling of the reaction mixture which is required before the reaction mixture is sent to the next reactor bed.

As mentioned above, the catalysts in the first and second zones preferably comprise non-noble metals. As representative examples of such catalysts, there may be mentioned nickel, Raney nickel, cobalt-molybdenum, nickel-molybdenum, and nickel-tungsten. The catalyst in the third reaction zone may comprise a noble metal or non-noble metal, as indicated above. Examples of noble metal catalysts include, but are not limited to, platinum and palladium.

The catalyst is preferably supported on a support such as, but not limited to, alumina, silica or combination thereof.

A representative example of a distillate fuel which is obtained according to the present invention is the following:

| Density, A.P.I. | 28–32 |
|---|---|
| Color (ASTM D-1500) | 0.5 |
| H/C Atomic Ratio | 1.7–2.1 |
| Sulfur | <5–500 ppm |
| Nitrogen | <5 ppm |
| FIA, vol. % | |
| Aromatics | 30–40 |
| Olefins | 0.3–0.7 |
| Saturates | balance |
| Distillation, ° F. | |
| Initial, B.P. | 250–325 |
| 10% | 340–445 |
| 50% | 475–540 |
| 90% | 600–660 |
| End Point | 680–740 |

It is noted that the process of the present invention can be used to produce distillate fuels having sulfur concentrations as low as 5–50 ppm, aromatics concentrations as low as 5–20%, and color specifications of 0.5–1 by ASTM D-1500.

This invention simplifies the reactor internals by eliminating the need for quench box trays at the inlet to each reaction zone.

This invention can also be applied to counter-current reactor configurations. The last reaction zone will be counter-current.

As will be apparent to persons skilled in the art, various modifications and adaptations of the structure above described will become readily apparent without departure from the spirit and scope of the invention, the scope of which is defined in the appended claims.

What is claimed is:

1. A process for making distillate fuels from distillate hydrocarbon feed, comprising:

introducing distillate hydrocarbon feed and hydrogen gas into the top of a first reaction zone of a multi-bed reactor in order to produce a first reaction mixture, removing the first reaction mixture from the multi-bed reactor at the bottom of the first reaction zone, cooling the removed first reaction mixture in a first heat exchanger wherein said distillate hydrocarbon feed functions as the cooling medium, injecting hydrogen gas into the cooled first reaction mixture in order to increase the hydrogen partial pressure and reduce the density of the first reaction mixture, and introducing the cooled first reaction mixture containing the injected hydrogen gas into a second reaction zone of the multi-bed reactor in order to produce a second reaction mixture.

2. A process according to claim 1, wherein the first reaction mixture is cooled to a temperature of about 600 to 660° F. in the cooling step.

3. A process according to claim 1, wherein the hydrogen gas is injected in the injection step in an amount sufficient to provide about half of the cooling requirement for the first reaction mixture prior to introduction of the first reaction mixture into the second reaction zone.

4. A process according to claim 1, further comprising the steps of:

removing the second reaction mixture from the multi-bed reactor, cooling the removed second reaction mixture in a second heat exchanger, injecting hydrogen gas into the second reaction mixture in order to increase the hydrogen partial pressure and to reduce the density of the second reaction mixture, and introducing the cooled second reaction mixture containing the injected hydrogen gas into a third reaction zone of the multi-bed reactor in order to obtain a third reaction mixture.

5. A process for controlling the temperature in a multi-bed reactor system for making distillate fuels, the reactor including a first reaction zone for reacting hydrocarbon feed and hydrogen gas to produce a first reaction mixture, and a second reaction zone, the process comprising:

introducing the hydrocarbon feed and hydrogen into the top of the first reaction zone and producing the first reaction mixture, removing the first reaction mixture from the bottom of the first reaction zone, cooling the removed first reaction mixture in a heat exchanger wherein the hydrocarbon feed functions as the cooling medium, injecting hydrogen gas into the cooled first reaction mixture in order to reduce the density of the first reaction mixture and to further cool the first reaction mixture, and introducing the further cooled first reaction mixture into the second reaction zone.

6. A process according to claim 5, wherein the quantity of hydrogen gas which is injected in the injecting step reduces the overall pressure drop across the reactor and promotes circulation in the reactor.

7. A process according to claim 5, wherein the hydrogen gas is injected in the injecting step in a quantity which provides for about half of the total cooling which is required before introducing the first reaction mixture to the second reaction zone.

* * * * *